United States Patent [19]

Hoehn et al.

[11] 4,074,796

[45] Feb. 21, 1978

[54] ADJUSTABLE SEQUENCE VALVE FOR TOWING WINCH HYDRAULIC CONTROLS

[75] Inventors: Richard F. Hoehn, Pekin; Hugh C. Morris, Morton; Henry T. Therkildsen; Bertwin E. Behrends, both of East Peoria, all of Ill.

[73] Assignee: Caterpillar Tractor Co., Peoria, Ill.

[21] Appl. No.: 654,484

[22] Filed: Feb. 2, 1976

[51] Int. Cl.$^2$ .............................................. F16D 67/02

[52] U.S. Cl. .................................. 192/3.57; 137/538; 192/109 F; 192/87.13

[58] Field of Search ............................ 192/3.57, 87.13

[56] References Cited

U.S. PATENT DOCUMENTS

| | | | |
|---|---|---|---|
| 3,352,392 | 11/1967 | Black et al. | 192/3.57 |
| 3,386,543 | 6/1968 | Osburn | 192/3.57 |
| 3,621,955 | 11/9171 | Black | 192/3.57 |
| 3,729,171 | 4/1973 | Yates et al. | 192/3.57 |

*Primary Examiner*—Benjamin W. Wyche
*Attorney, Agent, or Firm*—Phillips, Moore, Weissenberger, Lempio & Majestic

[57] ABSTRACT

A towing winch system with fluid pressure actuated power input and winch input clutches disposed serially between the power take-off and cable drum. A controlled but variable reduced fluid pressure from a source is applied to the winch input clutches and full fluid pressure is applied to the power input clutch through a valve which opens in response to and when the pressure applied to the winch input clutches exceeds a manually selectable low or high value for inching or non-inching operation, respectively.

4 Claims, 5 Drawing Figures

ADJUSTABLE SEQUENCE VALVE FOR TOWING WINCH HYDRAULIC CONTROLS

BACKGROUND OF THE INVENTION

Towing winches are widely used in the construction, logging, pipe-laying, mining and reclamation industries. A typical towing winch may comprise a cable drum rotatably mounted on a vehicle, a drive means for rotating the cable drum, a winch input means, two winch input clutches for coupling the winch input means to the drum drive for selectively rotating the drum in a reel-in or reel-out direction upon sequential actuation of the winch directional clutches and a power input clutch to couple the winch input means to the power take-off from the engine on which the winch is mounted, the power input clutch being in series with the winch input clutches. An example of such a winch is that shown in U.S. Pat. No. 3,729,171.

The basic purpose of the present invention is to provide a winch control which will prevent tractor lurching when power is applied to the winch at a time that the tractor is in motion and to provide an adjustment mechanism that may easily be made by the operator to change between an inching mode of winch operation and a non-inching mode.

SUMMARY OF THE INVENTION

Fluid-actuated clutches are used in the system. Fluid pressure from a suitable source is applied through a manually adjustable valve (first valve) to the desired directional clutch. The pressure is controlled by the valve to an adjustably variable controlled value so that the degree of winch directional clutch engagement and slippage can be controlled. Full source pressure is applied to the power input clutch through a second valve for positive coupling of the power take-off to the winch input.

The second valve is provided with a valve actuator that is responsive to the pressure applied to the winch directional clutches so that the second valve will open when the pressure applied to the winch directional clutches exceeds a predetermined value.

The operator, by a simple adjustment, may select a predetermined value at which the valve actuator is to open the second valve. When low pressure actuation is selected, the power input clutch couples the power take-off to the winch input over most of the range of pressure that is applied to the winch directional clutches so that the winch can be operated in an inching mode, with power applied to the drum through the controlled slippage of the winch directional clutches.

When high pressure actuation is selected, for noninching operation, the power input clutch is prevented from being actuated through the second valve until such time as one of the winch directional clutches is substantially fully pressured.

Other objects and advantages will be set forth in the course of the following detailed description of the invention.

BRIEF DESCRIPTION OF THE DRAWINGS

In the drawings, wherein like parts are designated by like reference numerals through the same.

DESCRIPTION OF THE PREFERRED EMBODIMENT

Figure 1:
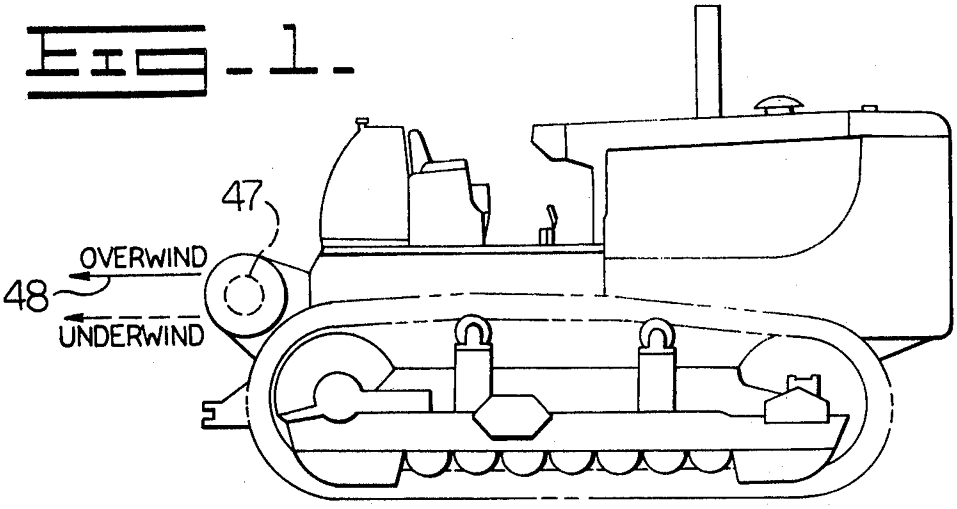
FIG. 1 is a side elevation of a track-type tractor having a towing winch embodiment of the invention mounted thereon.
Figure 3:
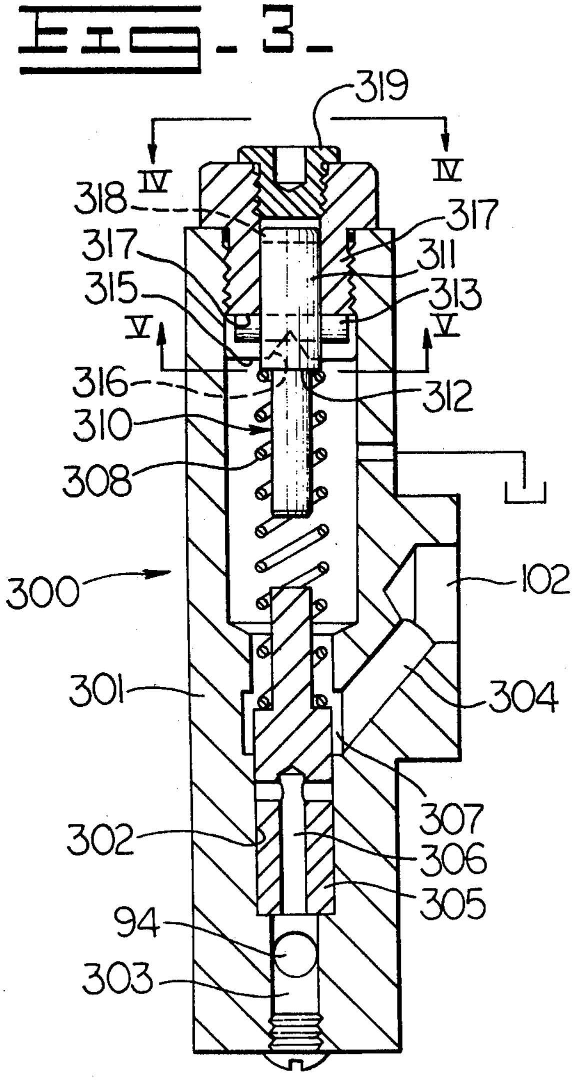
FIG. 3 is a sectional view of the sequence valve used in the control system of FIG. 2.
Figure 4:
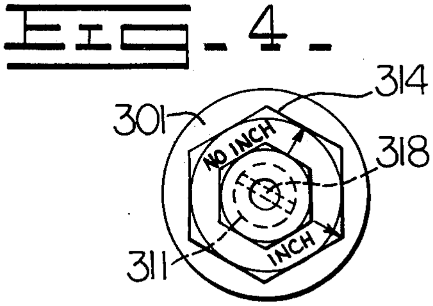
FIG. 4 is a top view of the sequence valve of FIG. 3.
Figure 5:
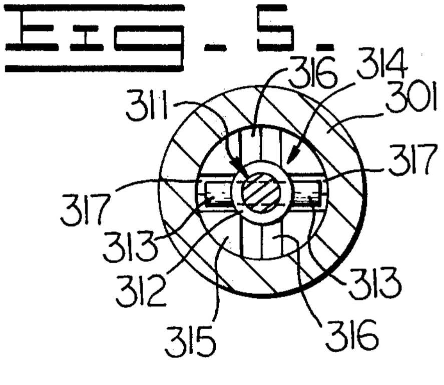
FIG. 5 is a sectional detail of the sequence valve, taken on line V—V of FIG. 3.

The winch embodiment illustrated in the drawings is driven by means of a power input means or shaft 10 comprising standard power take-off from an internal combustion engine (not shown) of the FIG. 1 tractor. A normally disengaged input clutch means 11 (FIG. 2) may be actuated to selectively rotate a first bevel gear 15 of the winch input means. Clutch 11, as well as the two winch clutches hereinafter described, is preferably of the fluid (preferably oil) actuated, friction disc type.

The first bevel gear 15 meshes with opposed second and third bevel gears 16 and 17 of the winch directional rotation means. Bevel gear 16 is secured to a carrier 18, rotatably mounted on a shaft 19. The carrier and shaft are adapted to be coupled together by drive means including a first, normally-engaged winch clutch means 20 comprising sets of interleaved friction discs alternately mounted for axial movement on the carrier and shaft by standard spline connections. The friction discs are disengaged when clutch chamber 22 is pressurized to move annular piston assembly 23 to the right in FIG. 2. The discs are normally compressed together to engage the clutch means by back-to-back Belleville type spring washers 24.

Bevel gear 17 is adapted to impart drive through a substantially identical second winch clutch means 25 comprising a carrier 26, rotatably mounted on common shaft 19, and interleaved clutch discs alternately splined for axial movement on the carrier and shaft. Belleville type spring washers 28 normally engage the clutch whereas pressurization of an actuating chamber 29 will disengage same by moving piston assembly 30 to the left in FIG. 2. When both clutches 20 and 25 are engaged, the drive train is locked, which prevents a cable drum 47 from rotating.

When only second winch clutch 25 is disengaged, bevel gear 16 will rotate carrier 18 and thus shaft 19 in a first rotational direction. Conversely, when only first winch clutch 20 is disengaged, bevel gear 17 will impart rotation to carrier 26 to in turn rotate shaft 19 in an opposite direction. Pressurization of both chambers 22 and 29 will permit shaft 19 to rotate freely during a "brake-off" mode of winch operation, hereinafter fully described.

Shaft 19 and a coaxial shaft 31 are mounted for rotation in bearings 32 and connected together by gear reduction means comprising a planetary gear set 33. The conventional planetary gear set includes stationary ring gear 34, sun gear 35, planet gears 36, and carrier 37 secured to shaft 31. The shaft has a pinion gear 38 secured thereto which meshes with a gear 39 to in turn drive gear 40 secured to shaft 41, rotatably mounted in the winch.

Gear 40 meshes with gear 42 secured to hub 43, splined or otherwise suitably secured to a shaft 44. The latter shaft is suitably mounted for rotation in spaced stationary bearings 45 and 46 and has a cable drum 47 attached thereto. The cable drum may have a standard cable 48 (FIG. 1) entrained thereon in a conventional manner to perform the various winch operations. Cable 48 may be wound on drum 47 to pass rearwardly from the top or bottom of the drum corresponding to the overwind and underwind conditions shown in FIG. 1.

Figure 2:
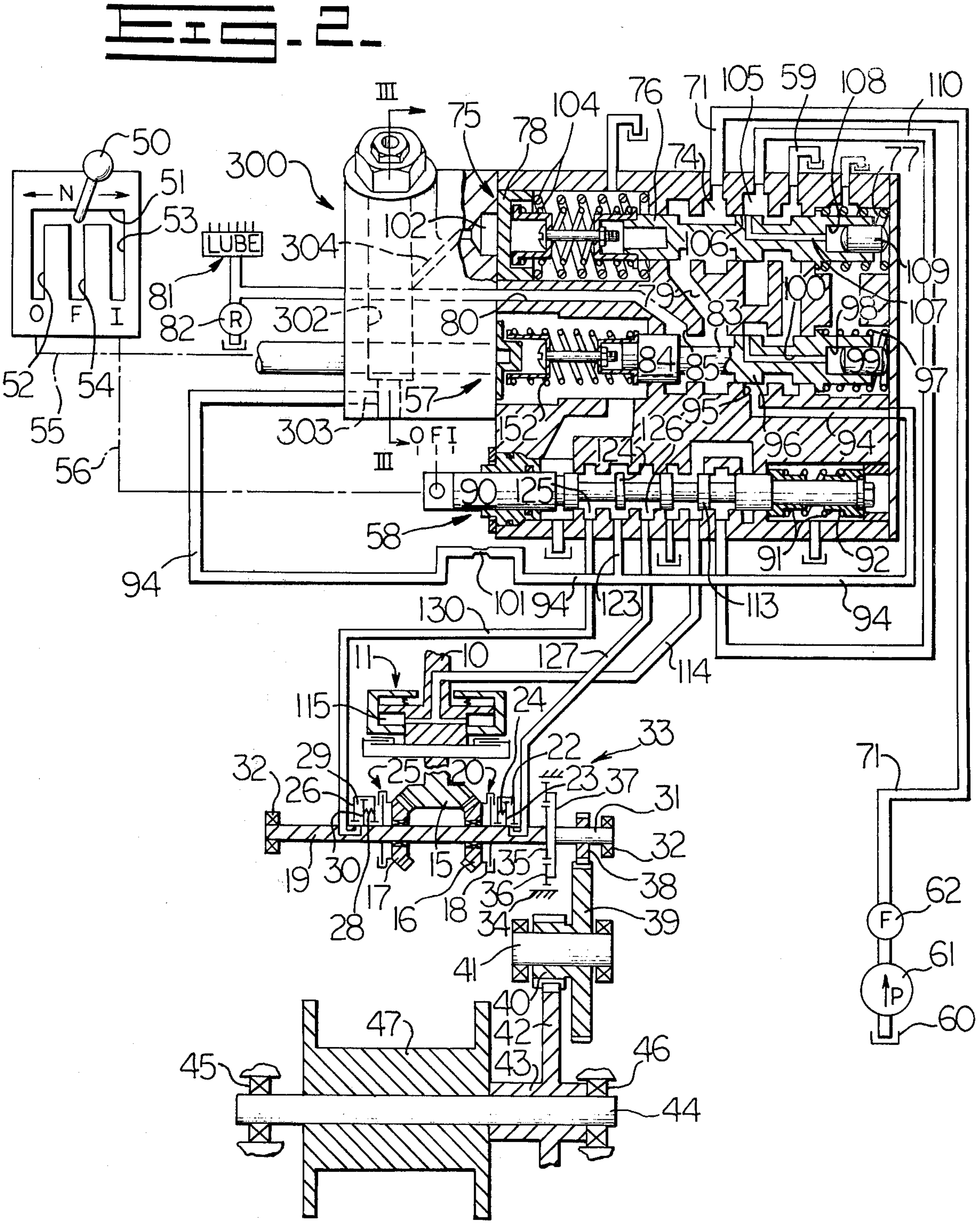
FIG. 2 schematically illustrates the winch and a hydraulic control system therefor incorporating the principles of the present invention.

The FIG. 2 control system comprises a single manually-operable control lever 50 which may be selectively moved by the operator in slots 51-54 to condition the control system for the following modes of winch operation: "Neutral" (N) wherein the lever is positioned in horizontal slot 51 to engage winch clutches 20 and 25 while maintaining power input clutch 11 disengaged; "Reel-Out" (O) wherein the lever is moved downwardly in slot 52 to disengage one of the winch clutches only and to engage the power input clutch to rotate drum 47 in a first direction to pay-out cable therefrom; "Reel-In" (I) wherein the lever is moved downwardly in slot 53 to disenage the second winch clutch only and to engage the power input clutch to rotate the drum in a second, opposite direction to reel in the cable; and "brake-off" (F) wherein all the clutches are disengaged to permit the drum to rotate freely.

Control lever 50 is connected by linkage means, schematically shown at 55 and 56 to translate the motion of the lever to the spools of pressure control valve 57 (which functions in the system as a pressure regulator valve means for reducing the pressure at the inlet thereof to adjustable controlled values, as more fully described below) and selector control valve 58, respectively. In particular, horizontal movement of lever 50 in slot 51 of the double U-shaped shift pattern will provide manual operation of the selector valve 58 without affecting valve 57, and vertical movement of the lever in any of the slots 52, 53 or 54 will provide a manual adjustment of valve 57 without affecting selector valve 58. The lever is horizontally-biased by means of retainers 91 and with spring 92 between to automatically return it to its FIG. 2 position upon release thereof by the operator spring 152 moves lever 50 vertically.

The integrated control system and functions thereof are best explained by describing the above-mentioned modes of winch operation. During all such modes of operation, a source of fluid under pressure, comprising a sump 60 (e.g., the closed chamber of the winch housing which is partially filled with oil), engine-driven and positive displacement pump 61 and filter 62, function o communicate pressurized oil to a conduit 71.

Conduit 71 communicates oil to inlet 74 of pressure modulating valve 75. The valve comprises a spool 76 biased leftwardly by coil spring 77 and adapted to be moved rightwardly by servo means including a cup-shaped load piston 78.

In the neutral condition shown, pressurized oil from inlet 74 communicates with passage 79 and lube passage 80. The lube passage in turn communicates low pressure oil (e.g., 40 psi) to a lube system or lubrication means 81. A relief valve 82 functions to maintain the lube pressure at an acceptable, safe level. The lube system functions to cool and lubricate the friction discs of the winch and input clutch and to also lubricate the various bearings and gears during all modes of winch operation.

Valves 57 and 75 are identical valves connected in series, except that valve 57 operates by a mechanical means 55 whereas valve 75 moves from hydraulic pressure flowing through a conduit 94 to piston 78 to provide a force on springs 104. Valves 57 and 75 are in series because when valve 75 exhausts, it provides the supply to valve 57.

The first movement of linkage means 55 rightwardly (in response to downward movement of lever 50) moves spool 83 of pressure control valve 57 rightwardly against the bias of spring 97, to close off drain 85 and open conduit 94 to supply pressure. Then, as pressure builds up in conduit 94, it will reach a level determined by the load of springs 152. When pressure reaches this level, it exhausts to the lube circuit described before, through spool 83 having a land 84 formed thereon which cooperates with an inlet 85 to lube passage 80 to form a variable passage thereat. The size of such passage may be controlled to induce the desired pressure drop thereacross to communicate the lower or downstream pressure to the lube system. It can be seen that pressure in circuit 94 can be controlled by the operator by varying loads on spring 152.

When lever 50 is moved leftwardly in slot 51 to a position above slot 52, i.e. to its "O" position, spool 90 of selector valve 58 is moved leftwardly by linkage means 56 to its "O" position to condition the system for the "O" mode of winch operation. The valve spool is held in such position by the operator. Downward movement of the lever to a first position (e.g., twenty percent of the length of slot 52) will cause the pressure in conduit 94 to be approximately 60 psi and will initiate disengagement of clutch 20.

The oil pressure communicating the first winch clutch preferably increases in direct linear proportion to further downward movement of the control lever. When the lever is in its "O" position and at the bottom of slot 52, the oil pressure in chamber 22 of the first winch clutch will be at the maximum 250 psi level.

In particular, downward movement of lever 50 in slot 52 of lever 50 moves spool 83 of pressure control valve 57 rightwardly by linkage means 55 to communicate passage 79 with an outlet conduit 94 via a controlled, variable passage means comprising an annular groove 95 and an annular land 96. The size of the variable passage means may be controlled by manipulating lever 50 vertically in slots 52, 53 or 54 to effect the desired pressure drop thereacross. Spool 83 is biased leftwardly by coil spring 97 and by oil pressure communicated to chamber 98, having positioning slug 99 mounted therein, by means of a passage 100.

Conduit 94 communicates with branch conduit 123 which communicates with groove 126 and conduit 127 from valve 58. The latter conduit communicates pressurized oil (e.g., 60 psi to 250 psi) to chamber 22 of first winch clutch 20 to permit it to slip or to completely release same depending upon the degree of pressure applied to the clutch. When lever 50 is at its "O" position to only engage the input clutch and the second winch clutch, cable drum 47 will be rotated in a first direction to pay-out cable therefrom or "reel-out".

The controlled reduced-pressure oil in conduit 94 passes through a restricted orifice 101 to sequence valve 300 which comprises a valve body 301 having a bore 302 therein and inlet and outlet passages 303 and 304 communicating with the bore. Outlet passage 304 is connected to chamber 102 of valve 75. Valve member 305 is disposed in the bore between the inlet and outlet passages and is axially movable between the illustrated closed position blocking communication between the inlet and outlet passages and an open position wherein upstream fluid can pass through valve passage 306 to annular chamber 307 and to the outlet passage 304.

Fluid pressure upstream of valve member 305 urges the valve member towards its open position, against the bias of compression spring 308 which is compressed between the valve member and the stop pin assembly 310.

Stop pin assembly 310 comprises an elongated plunger 311 mounted in the valve body for axial and rotational movement relative to the valve body, the plunger having a spring retainer seat 312 thereon facing towards the valve member 305 and in engagement with spring 308. Plunger 311 has a radially extending stop pin 313 thereon. Cylindrical plug 314 is fixed in valve body 301 and surrounds plunger 311, plug 314 having an end face 315 facing towards valve member 305 and two radially disposed Vee notches 316 and 317 formed 90° apart in the end face to serve as pin seats.

Plunger 311 has a slot 318 in the end of the plunger, parallel to pin 313, to allow the winch operator to remove plug 319 and insert a screwdriver through the open end of plug 314 and rotate the plunger so that the pin 313 will be selectively positioned in one of the desired Vee notches 316, 317, as indicated by the indicia on plug 314. Spring 308 will bias pin 313 into the selected notches.

The two Vee notches are of different depths so that the bias force of spring 308 against valve member 305 can be set to a low or high value. In the present winch system, when pin 313 is seated in the deeper Vee notch 317, approximatley 100 psi upstream pressure will be required to cause valve member 305 to move to open position. When pin 313 is seated in the shallower Vee notch 318, approximately 180 psi will be required to open the valve.

Before valve 300 opens, the components of pressure-modulating valve 75 are in a position as shown in FIG. 2. The inlet pressure in inlet 74 exerts equal hydraulic forces in both directions on spool 76 and spool 76 is urged to the leftward position shown by the force of spring 77.

When valve 300 opens to allow fluid under pressure to flow to chamber 102 in valve 75, piston 78 is urged to the right against the bias of outer spring 104. Such movement is transmitted through the inner spring 104 to spool 76, moving the spool to the right against the bias of spring 77, so that inlet 74 is communicated with outlet passage by the passage means comprised of annular groove 105 and land 106 of spool 76. Only a low pressure in chamber 102 is required for such movement of spool 76 to its input clutch fill position.

With inlet 71 now in communication with groove 105 and outlet passage 110, hydraulic pressure is also communicated through spool passage 107 to chamber 108 having a reciprocable slug 109 positioned therein. Hydraulic pressure is now exerted on the spool, over the cross-sectional area of chamber 108, urging the spool leftwardly. With the hydraulic forces on spool 76 no longer balanced, spool 76 will move to the left until passage 107 can exhaust to outlet 59 sufficiently to reduce the pressure in chamber 108 so that the force of inner spring 104 again moves the spool rightwardly to repressure groove 105 from inlet 74, which again repressures chamber 108 to urge the spool leftwardly. In such functioning as a pressure-modulating valve, valve 75 provides a means for gradually filling the actuating chamber of the input clutch 11 to prevent abrupt engagement thereof. Since leftward movement of spool 76 opens inlet 74 to outlet passage 79 before passage 107 can relieve to outlet 59, fluid flow from inlet 74 is never fully cut off from outlet 79, allowing inlet pressure to be communicated through valve 75 to valve 58 during the time that valve 75 is functioning to supply fluid pressure to outlet 110.

Valve 75 functions in the system as a normally-closed valve having its inlet connected by conduit 71 and an outlet connectable by conduit 110 to clutch 11, valve 75 having open and closed positions wherein conduits 71 and 110 are in or out of communication, respectively. As brought out above, valve 75 also functions to provide pressure to valves 57 and 58 for actuation of clutches 20 and 25 whether conduits 71 and 110 are in or out of communication. When valve 75 is in open position, pressurized oil under source pressure (e.g., 300 psi) is communicated from conduit 71 to conduit 110 and thus to selector valve 58. Movement of selector spool 90 to the left will position land 113 so that full pressure oil will flow from conduit 110 to conduit 114 and thus to the actuating chamber 115 of normally disengaged friction clutch 11. When chamber 115 is pressured, the friction discs of the clutch will be compressed together to couple the power input shaft 10 to bevel gear 15 of the winch input means. Release of pressure from chamber 115 will cause the clutch to disengage and uncouple the power input means from the winch input means.

Inching control of the cable drum is achieved by first manually positioning the stop-pin assembly in the "inch" position, i.e., with pin 313 in the deeper Vee notch 317, and then by suitably manipulating lever 50 vertically in slot 52. As mentioned previously, vertical movement of handle 50 in one of the slots 52, 53 or 54 causes valve 57 to reduce the pressure from source 61 to an adjustable controlled level by precisely controlling the pressure drop across the variable orifice comprising groove 95 and land 96. The controlled pressure in conduit 94 (e.g., 60 psi to 250 psi) will thus be communicated to chamber 22 of the winch clutch 20 to control disengagement and slippage thereof.

When the handle 50 is moved part way down in slot 52, and the pressure in conduit 94 reaches approximately 60 psi, clutch 20 will begin to disengage. Further downward movement of the handle will cause the pressure in conduit 94 to increase. When this pressure reaches approximately 100 psi, valve 300 will open, allowing the pressure in conduit 94 to pass through valve 300 and operate on valve 75, moving spool 76 to the right so that it will allow the fluid in inlet line 71 to flow to outlet line 110 and cause full pressure to be applied to clutch 11 so that the power input shaft 10 is coupled to the bevel gear 15. The cable drum is now driven but at a retarded speed due to the slippage of still partially-engaged clutch 20. Continued downward movement of handle 50 will increase the pressure in conduit 94 and clutch 20 so that an increasing degree of clutch slippage will occur as desired. Full downward movement of handle 50 will cause full pressure to be applied to clutch 20 so that it is fully disengaged, allowing the clutched bevel gear 17 to be driven at full speed.

If the operator wishes instead to operate the winch in a non-inching mode, the stop-pin assembly 310 is positioned so that pin 313 is seated in the shallower Vee notch 316 in the end of plug 314, to increase the bias of spring 308 against valve member 305. Movement of handle 50 to the left in slot 51 will shift spool 90 of valve 58 to the left, as before, to communicate conduit 127 with conduit 94 and to communicate conduit 114 with conduit 110 so that the clutches 20 and 11 can be actuated. Downward movement of handle 50 in slot 52 will cause valve 57 to open so that inlet pressure is admitted to conduit 94. When valve 57 has been opened sufficiently so that the pressure in conduit 94 is approximately 60 psi, clutch 20 will begin to disengage. Continued downward movement of handle 50 in slot 52 will cause the pressure in conduit 94 to increase so that clutch 20 becomes progressively more disengaged. When the handle has been moved down far enough so that the pressure in conduit 94 reaches approximately 180 psi, valve 300 will open, allowing pressure fluid to pass to chamber 102 of valve 75 so that valve 75 will be actuated to communicate the inlet conduit 71 with conduit 110. Full pressure in conduit 110 will now actuate the power input clutch 11, at a time when clutch 20 is substantially fully disengaged.

When lever 50 is moved to its "I" position at the bottom of slot 53, valves 57 and 75 will function substantially as described above. However, selector control valve 58 is actuated to move spool 90 thereof rightwardly to its "I" position to block annular groove 126. Inlet conduit 123 from conduit 94 communicates with annular groove 125 and thus conduit 130 communicates pressurized fluid to clutch chamber 29 to release second winch clutch 25. Therefore, the above-described "O" mode of operation is reversed and the cable drum 47 will rotate in an opposite direction to "reel-in".

When lever 50 is moved downwardly in slot 54 to the "F" position, valves 57 and 75 will again function substantially as described above. However, spool 90 of selector control valve 58 is now positioned at its intermediate "F" position whereby land 124 will assume the position illustrated in FIG. 2. Thus, pressurized fluid from conduit 123 will communicate both outlet conduits 127 and 130 to fully or partially (slip) disengage both of the winch clutches.

In addition, land 113 will be in a blocking position preventing conduit 110 from communicating with conduit 114 to thus prevent engagement of input clutch 11. The winch is now in its "F" condition of operation.

What is claimed is:

1. A control for a winch system, said winch system having a cable drum, drive means for rotating said drum, a winch input means, means including first and second fluid pressure actuated clutch means for coupling said winch input means to said drive means to rotate said drum in one direction when said first clutch means is actuated and to rotate said drum in the opposite direction when the second clutch means is actuated, power input means and a third fluid pressure actuated clutch means for coupling said power input means to said winch input means when said third clutch means is actuated, said control comprising:

a. a source of fluid under pressure;

b. means for adjustably reducing the pressure of fluid from said source and for applying the reduced pressure fluid to said first and second clutch means;

c. means including a normally closed valve for applying pressure fluid from said source to said third clutch means when said valve is open; and d. means responsive to the pressure level of said reduced pressure fluid including a manually positionable member having first and second positions for opening said valve when said manually positionable member is in its first position and said pressure level exceeds a predetermined low level and for opening said valve when said manually positionable member is in its second position and said pressure level exceeds a predetermined high level.

2. A control for a winch system, said winch system having a cable drum, drive means for rotating said drum, a winch input means, means including first and second fluid pressure actuated clutch means for coupling said winch input means to said drive means to rotate said drum in one direction when said first clutch means is actuated and to rotate said drum in the opposite direction when the second clutch means is actuated, power input means and a third fluid pressure actuated clutch means for coupling said power input means to said winch input means when said third clutch means is actuated, said control comprising:

a. a source of fluid under pressure;

b. a manually adjustable pressure regulator valve means having an inlet connected to said source for reducing the pressure of said fluid to adjustable valves;

c. a normally closed valve means having an inlet connected to said source and having open and closed positions and a pressure actuated valve operator means for actuating said valve to open position;

d. manually operable selector valve means for connecting the outlet of said normally closed valve means to said third clutch means and for selectively connecting the outlet of said pressure regulator means to said first and second clutch means; and e. means responsive to the level of the reduced pressure at the outlet of said pressure regulator valve means including a manually positionable member having a first position for causing actuation of said normally closed valve means to open position when said level of reduced pressure exceeds a first value and a second position for causing actuation of said normally closed valve means to open position when said level of reduced pressure exceeds a second and higher value.

3. A control as set forth in claim 2, wherein said means (e) includes a conduit from the outlet of said pressure regulator valve means to said valve operator of said normally closed valve.

4. A control as set forth in claim 3, wherein said means (e) includes a valve member positioned in said conduit for movement to open position by fluid pressure from the outlet of said pressure regulator valve means, spring means biasing said valve member to closed position and wherein said manually positionable member engages and compresses said spring means to exert a bias force on said valve member which is greater when said manually positionable member is in its first position.

* * * * *